Jan. 30, 1940.    F. MOORE    2,188,514
TRIPOD
Filed June 25, 1938
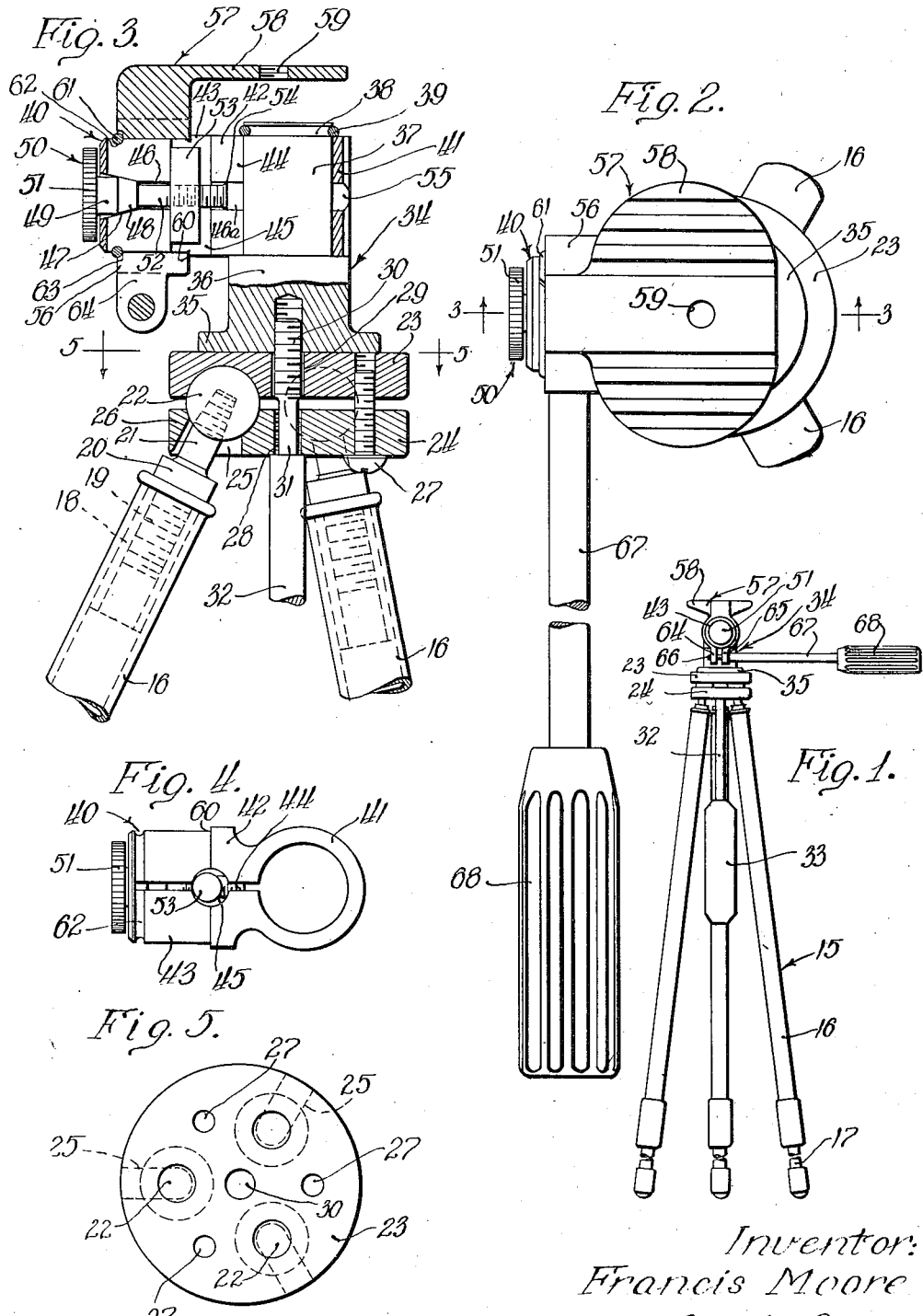
Inventor:
Francis Moore
By Brown, Jackson, Boettcher & Dienner
Att'ys Patented Jan. 30, 1940

2,188,514

UNITED STATES PATENT OFFICE 2,188,514

TRIPOD

Francis Moore, Chicago, Ill., assignor to Albert Specialty Company, Chicago, Ill., a partnership composed of Stanley Flesch and Harold Flesch Application June 25, 1938, Serial No. 215,778

3 Claims. (Cl. 248—181)

This invention relates to means for supporting cameras and like instruments, and has to do with tripods.

My invention is directed to a tripod for supporting a camera or like instrument and provided with means whereby the legs of the tripod may be adjusted with facility and locked in adjustment with respect to the angular position thereof relative to the tripod head. Further objects and advantages will appear from the detail description.

In the drawing:

Figure 1 is a back view of a tripod embodying my invention, with the legs thereof partly broken away;

Figure 2 is a plan view of the tripod of Figure 1, on an enlarged scale, with the legs partly broken away and the operating handle partly broken away;

Figure 3 is a sectional view taken substantially on line 3—3 of Figure 2, certain parts being shown in elevation and certain other parts being shown partly broken away and in section;

Figure 4 is a detail plan view of the platform bracket supporting member; and

Figure 5 is a plan view of the tripod head.

The tripod of my invention comprises legs 15, each formed of two telescoping members 16 and 17 of cylindrical tubular steel construction. A ferrule 18 is suitably secured in the upper end of each leg and is interiorly threaded for reception of a screw stud 19 of a fitting 20, as shown in Figure 3. A second screw stud 21 extends upward from fitting 20 and screws into a ball 22. The three balls 22 are disposed between two discs 23 and 24 constituting the head of the tripod. Disc 23 is provided, in its underface, with recesses conforming in curvature to the balls 22, disc 24 being provided in its upper face with similar complementary recesses, the recesses of the discs being aligned and receiving the upper and the lower portions of the balls, as shown in Figure 3. Disc 24 is further provided with radial slots 25 extending downward therethrough from the ball receiving recesses, these slots flaring downward and outward of the disc and terminating short of the periphery thereof, providing stop elements 26 at the outer ends of the slots, the latter being of a width to accommodate the screw studs 21 while confining them against lateral movement.

Discs 23 and 24 are secured together by three headed screws 27, equally spaced circumferentially of the discs and disposed midway between the ball receiving recesses therein. Disc 24 is provided with openings of a diameter to slidably receive the screws 27, which screw into disc 23, the latter being appropriately bored and threaded to that end. Disc 24 is further provided with an axial threaded bore 28 concentric with an axial bore 29 extending through disc 23. The latter bore slidably receives a screw stud 30 at the upper end of the reduced shank 31 formed integrally with a locking rod 32 provided, at its lower end, with a grip or handle 33. Stud 30 threads into the base of a post 34 which seats upon the upper face of disc 23, which post is axially bored and threaded from its lower end for that purpose. The upper end of rod 32 provides a shoulder which, in the operative position of this rod, contacts the under face of disc 24. Screw stud 30 may be threaded downward through bore 28 for detaching it from post 34 or, if desired, for removing the locking rod.

Screws 27 are threaded into disc 23 a proper distance for forcing the discs 23 and 24 toward each other into pressure contact with the balls 22, exerting upon the latter a clamping action effective for presenting predetermined frictional resistance to movement of the legs of the tripod relative to the head thereof. This permits of ready adjustment of the legs as required and, by preventing casual displacement thereof, facilitates such adjustment. After the legs of the tripod have been adjusted radially of the head into desired position, stud 30 is screwed into post 34, by means of rod 32, to such an extent as to force the clamping discs 23 and 24 toward each other under increased pressure, effective for locking the legs against movement relative to the head, assuring that the adjustment of the legs will remain fixed during the use of the tripod. In this manner I provide means whereby the desired adjustment of the tripod legs may be effected with expedition and facility and, once such adjustment has been made, the legs are effectively locked against undesired accidental movement. Outward movement of the legs radially of the tripod head is positively limited by the stop elements 26 of disc 24. That is advantageous as eliminating possibility of complete collapse of the tripod, with resulting possible serious damage to the camera or other instrument, in the event the legs, through an oversight, are not locked in adjustment and the tripod is subjected to downward pressure sufficient to cause spreading apart of the legs.

Post 34 comprises a flanged base 35 seating upon the upper face of disc 23, a lower body portion 36 and an upper cylindrical stud 37 of reduced diameter. Adjacent its upper end stud 37 is provided with a circumferential groove 38 which receives a split ring 39. The post receives a platform bracket supporting member 40, comprising a split sleeve 41 from which extends an integral neck 42 split in the same plane as sleeve 41, this neck having a reduced cylindrical portion 43. Sleeve 41 fits about post 37 and seats upon the upper end of body 36, being confined between the latter and ring 39 and normally free for turning movement about stud 37. The slot or split in neck 42 is a continuation of the slot in sleeve 41 and terminates a short distance from the outer end of the neck, as will be clear from Figure 4. This slot is designated by the reference number 44 in the latter figure. Neck 42 is further provided, adjacent its inner end, with a cylindrical opening 45 perpendicular to and intersecting slot 44. Opening 45 also intersects a cylindrical bore 46 extending through neck 42 axially thereof, inner portion 46a of this bore being of increased diameter and extending through collar 41, as shown in Figure 3. At its outer end bore 46 opens into an inwardly tapering frusto-conical recess 47, extending from the outer end of neck 42 and concentric with bore 46. Recess 47 receives and cooperates with a frusto-conical wedge element 48 extending from the inner end of a cylindrical element 49 of a combined screw and wedge member 50 provided, at its outer end, with a knurled head 51. Member 50 further comprises a reduced shank 52, extending from the inner end of element 48 through bore 46 and threading through a cylindrical block 53 disposed in and of considerably less diameter than the opening 45. The inner end of screw shank 52 preferably is peened over or spread at 54, to prevent complete withdrawal of shank 52 from block 53, the increased diameter of portion 46a of bore 46 accommodating this spread or peened end portion of the screw shank. Conveniently collar 41 is provided with an opening 55 coaxial with portion 46a of bore 46, which opening accommodates a suitable tool for spreading or peening the inner end of shank 52. Any other suitable means may be provided to prevent complete withdrawal of screw shank 52 from block 53.

Cylindrical portion 43 of neck 42 receives a split collar 56 of a plate bracket member 57, comprising a camera receiving plate 58 formed integrally with and disposed perpendicular to collar 56. Plate 58 may be of any suitable form and conveniently provided with a threaded bore 59, for reception of a screw member by means of which a camera or like instrument is secured upon plate 58. Collar 56 is confined between shoulder 60, at the inner end of portion 43 of neck 42, and a split ring 61 seating in a circumferential groove 62 adjacent the outer end of neck 42, collar 56 being provided with a recess 63 accommodating the inner portion of ring 61. In its uncontracted condition collar 56 is free to turn upon portion 43 of neck 42, the supporting plate 58 being thus mounted for turning movement about both a horizontal axis and a vertical axis.

Collar 56 is provided with two depending terminal lugs 64 and 65, the former bored and threaded and the latter being provided with an unthreaded bore aligned with the bore of lug 64. Lug 65 slidably receives a reduced screw stud 66 which threads through lug 64, stud 66 being formed integrally with a rod 67, at one end thereof, said rod being provided at its other end with an elongated knob or grip 68 constituting, with the rod, an operating handle. The end of the rod from which stud 66 extends provides a shoulder which contacts the outer face of lug 65. By screwing stud 66 into lug 64, sleeve 56 may be contracted about portion 43 of neck 42, to desired extent. When sleeve 56 is contracted tightly about portion 43 of neck 42, turning of this sleeve relative to the neck is prevented, bracket member 57 being thus locked to member 40. When the wedge and its screw member 50 is in its inoperative or outer position, with element 48 not in pressure contact with the surrounding wall of recess 47, contraction of sleeve 56 into locking contact with portion 43 of neck 42 does not contract collar 41 sufficiently to interfere with free turning movement of member 40 about stud 37. In that manner the camera supporting plate or platform 58 may be locked against movement about a horizontal axis while being freely movable about stud 37, the desired movement of the platform conveniently being effected by means of the operating handle. When collar 56 is not contracted, the platform 58 may be moved about a horizontal axis and a vertical axis, by means of the operating handle, as previously noted. In order to lock the platform against movement about stud 37, member 50 is screwed inward through block 53 so as to bring element 48 into contact with the surrounding wall of recess 47, under considerable pressure. The wedge element 48 prevents contraction of the outer end portion of the cylindrical portion 43 of neck 42 so that when the collar 56 is contracted it is distorted to a certain extent, the inner end of this collar being contracted to a greater extent than the outer end thereof, the collar then exerting a leverage effect with the fulcrum of the lever at the outer end of the collar. As a result, the collar 41 is contracted tightly about stud 37 so as to be frictionally locked thereon, thus preventing rotation of member 40 about stud 37 and, consequently, locking the platform 58 against rotation about stud 37. In order thus to lock collar 41 on stud 37, it is not essential that collar 56 be contracted so tightly as to be locked against turning movement on portion 43 of neck 42. By properly adjusting the contraction of collar 56 it is possible effectively to prevent turning of platform 58 about stud 57 while still permitting turning of this platform about the axis of neck 42, though under such conditions there will be some frictional resistance to this turning of the platform, as will be understood. It is, however, entirely practicable to prevent turning of member 40 about stud 37, in an effective manner, while permitting turning of platform 58 about the axis of neck 42. By releasing the collar 56 from contraction, it may be turned freely about portion 43 of neck 42 and member 40 may also be turned freely about stud 37. It is thus possible, by means of the operating handle, to turn the platform 58 about both a vertical axis and a horizontal axis, to lock the platform against turning movement about either axis, and to lock it against turning movement about stud 37 while permitting movement of the platform about the portion 43 of neck 42. In this manner I provide a simple and highly efficient camera mounting means controlled by a single operating handle in a manner to permit movement of the camera about either a vertical axis or a horizontal axis or both. This mounting and operating means is particularly suitable for taking panoramas with motion picture cameras, for which the tripod of my invention is particularly suitable, though it may be used to advantage for many other purposes.

While I have illustrated a preferred form of my invention, by way of example, it will be understood that changes in construction and arrangement of parts thereof may be made without departing from the field and scope of the same, and I intend to include in this application all such variations as fall within the scope of the appended claims.

I claim:

1. In a device of the character described, a head comprising two clamping members provided in their opposed faces with complementary recesses, legs having at one end balls seating in said recesses, means securing said members together in pressure contact with said balls effective for presenting predetermined frictional resistance to relative movement of said balls, and means for forcing said head members together independently of said securing means effective for increasing the frictional resistance to relative movement of said balls.

2. In a device of the character described, a head comprising two clamping discs provided in their opposed faces with complementary recesses, legs having at one end balls seating in said recesses, screws spaced apart circumferentially of said discs slidable through one of said discs and threading into the other disc effective for securing said discs in pressure contact with said balls, and means disposed centrally of said discs effective for forcing them together independently of said screws.

3. In a device of the character described, a head comprising an upper clamping disc and a lower clamping disc, said discs being provided in their opposed faces with complementary recesses, legs having at one end balls seating in said recesses, screws spaced apart circumferentially of said discs slidable through said lower disc and threading into said upper disc, said screws securing said discs together in pressure contact with said balls, a post seating on said upper disc, and a locking rod slidable through said discs centrally thereof having a shoulder contacting the under face of said lower disc and provided with a screw element threading into said post.

FRANCIS MOORE.